United States Patent [19]
Fuller

[11] Patent Number: 5,523,738
[45] Date of Patent: Jun. 4, 1996

[54] TURN INDICATOR SAFETY AUGMENTOR

[76] Inventor: Kenneth J. Fuller, 813 Cedar Ave., Drexel Hill, Pa. 19026

[21] Appl. No.: 216,063

[22] Filed: Mar. 22, 1994

[51] Int. Cl.$^6$ ............................................. B60Q 1/26
[52] U.S. Cl. .................... 340/475; 340/457; 340/474; 307/10.8
[58] Field of Search .................. 340/457, 475, 340/474; 307/10.8

[56] References Cited

U.S. PATENT DOCUMENTS

| 4,933,665 | 6/1990 | Bull et al. ........................... 340/457 |
| 5,099,222 | 2/1992 | Campagna ............................ 340/475 |
| 5,264,827 | 11/1993 | Giovanni .......................... 340/457 X |
| 5,309,143 | 5/1994 | Brown et al. .................... 340/457 X |

OTHER PUBLICATIONS

Cartoon entitled Non–Sequitur, which appeared on Oct. 22, 1993 on p. E–11 of the newspaper called The Philadelphia Inquirer, published in Philadelphia PA.

Front & reverse side of the cardboard backer from a shrink-wrap package entitled Loud Turn Signal Flasher, on the front side and bearing the identification "Ideal Division, Stant Corporation, St. Augustine, FL 32095" on the reverse side.

Primary Examiner—John K. Peng
Assistant Examiner—Edward Lefkowitz
Attorney, Agent, or Firm—Alfred Stapler; Lipton & Stapler

[57] ABSTRACT

A device is disclosed for providing drivers of road vehicles with additional audible indication that the turn signal system has been selected "on" and is still operating. The "flasher" device in road vehicles is supplemented with an electronic tone-producing device connected at its accessible power terminals such that the electronic tone is audible to the driver, emitting a series of short duration tones, preceded and preferably separated by significant time delays, occurring from the initiation until the cancellation of the turn signal.

9 Claims, 4 Drawing Sheets

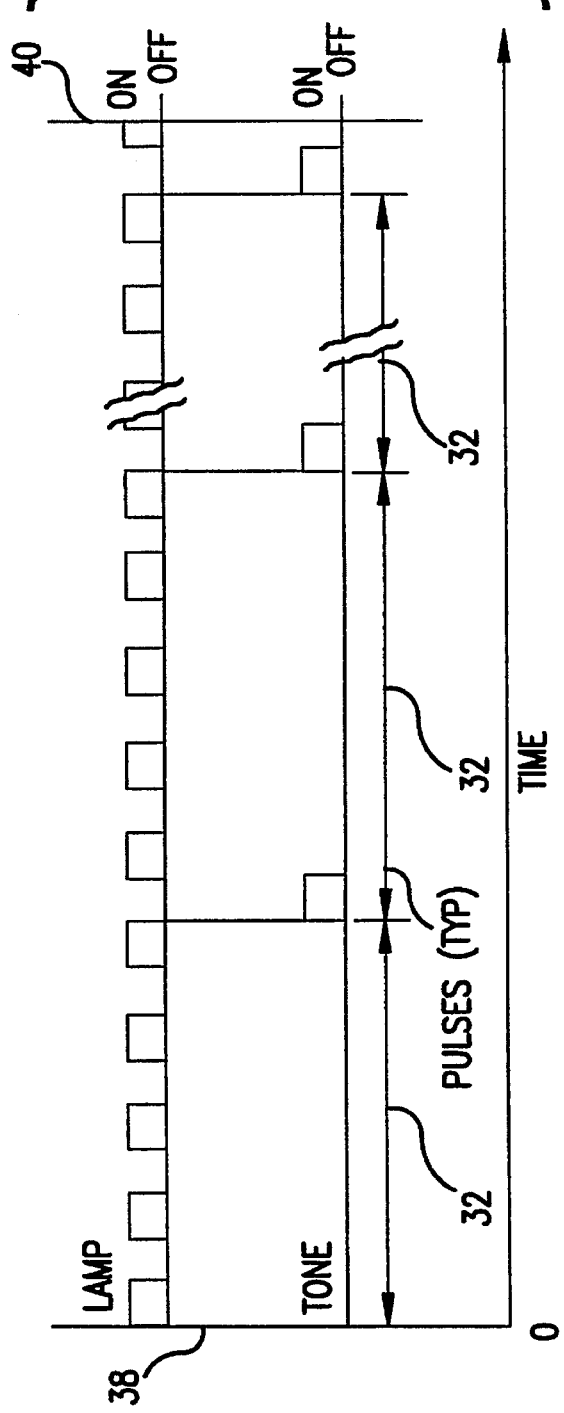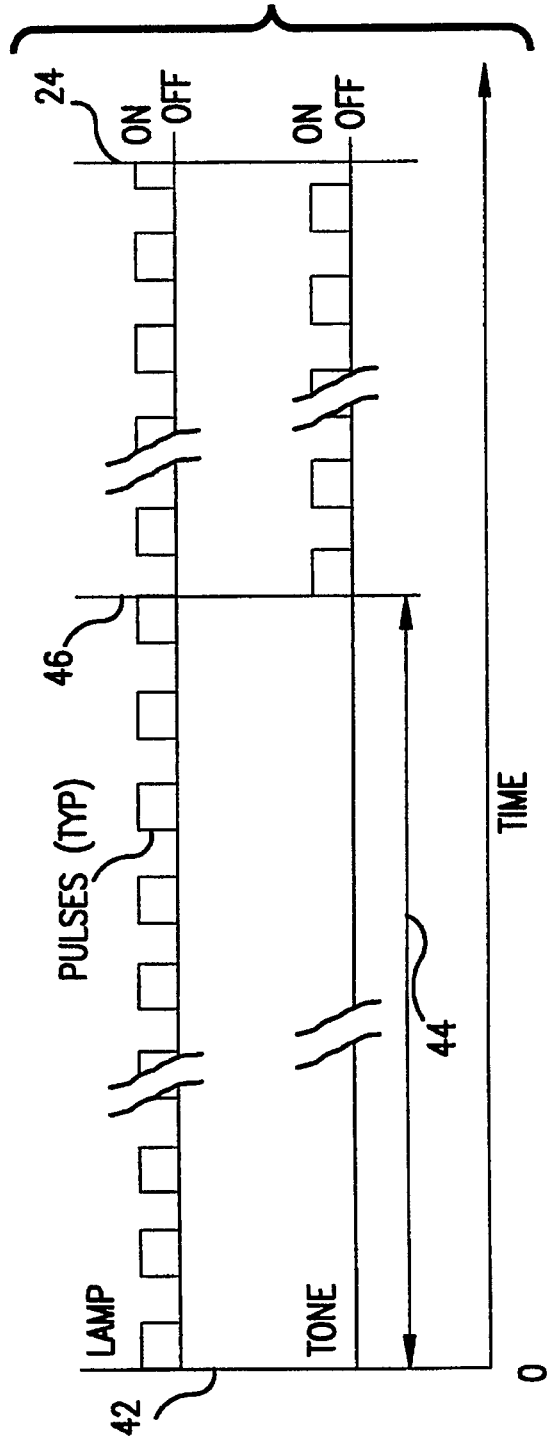

TURN INDICATOR SAFETY AUGMENTOR

BACKGROUND OF THE INVENTION

The invention relates to vehicle turn indicators, and more particularly to such indicators which, when actuated, provide an audible signal to the operator of the vehicle.

Third parties, whether drivers of other vehicles or pedestrians, tend to place considerable reliance on the validity of the external turn signals (usually flashing lights) emitted by a nearby vehicle for informing them of the path which that vehicle is intended to follow. If these external turn signals do not give a correct indication of that intended path, dangerous situations can arise which can readily result in serious accidents.

It is well-known that turn signals are conventionally turned "on" by the operator of a vehicle by placing a lever-actuated switch, usually mounted on the vehicle's steering column, into a detent corresponding to the direction of the intended turn. The turn signal is subsequently turned "off" automatically by a cam-operated mechanism, which restores the lever-actuated switch to the "off" position when the steering wheel rotates through a predetermined angle in the direction opposite to that signaled by the turn indicator. This automatic signal canceling technique is effective in most respects; however, it can inadvertently fail if the turning movement of the steering wheel, after the external signal has been turned on, is insufficient to enable the automatic cancellation mechanism to operate.

This can happen either because the vehicle operator decides not to make the signaled turn, after all, or because the turn was too shallow to enable the mechanism to function.

Conventionally, the turning on of external turn signals is accompanied by signals provided inside the vehicle to its operator. These take the form of a flashing light on the vehicle dashboard, accompanied by the "clicking" sound produced within the driver's seating area by the mechanism (usually a bi-metal electrical switch element) which causes the flashing of both the external and internal turn indicator lights.

It has been found that the functioning of these conventional internal signals is frequently inadequate to alert the vehicle operator to the fact that automatic cancellation of the external turn signals has not taken place as expected.

The flashing light on the dashboard is often insufficient because the vehicle operator's vision tends to be concentrated on the road, rather than on inside visual cues.

As for the clicking sound, this is often lost among other, more obtrusive sounds, such as traffic noise, conversations, radio playing, etc., or by its continuous and commonplace nature, it is simply overlooked.

Thus, it is common to see a vehicle travelling with its external turn signals flashing, but without making the indicated turn, even though the opportunity for doing so presents itself. Consequently, instead of giving a correct indication of the intended vehicle path, a misleading indication is provided.

This phenomenon is so prevalent that it has even been the butt of newspaper cartooning.

It has been proposed to overcome this shortcoming by installing a device which augments the clicking sounds emitted by the above-mentioned bi-metal flasher mechanism. Such a device is sold by the Ideal Division, Stant Corporation, St. Augustine, Fla., 32096, under the name "Loud Turn Signal Flasher", and the model designation 577V. The display card on which this device is mounted for sale states, inter alia, "Emits pulsing sound more than twice as loud as regular flashers to warn driver the turn signal is flashing. Replaces existing flasher unit."

While such a device tends to lessen the danger that the vehicle operator may simply fail to hear the turn indicator alerting sounds, it also introduces its own problems. The very loudness of the sound which it produces can, itself, be disturbing and may divert the vehicle operator from giving attention to other tasks required in the operation of the vehicle.

Also, the intrusiveness of this loud sound may actually discourage the operator from using the turn indicator, thereby creating its own potential for danger.

SUMMARY OF THE INVENTION

Accordingly, it is an object of the present invention to provide, inside the vehicle equipped with a turn signal indicator, sounds which augment the prior art and indicate to the operator that its turn signal is "on", while overcoming one or more of the drawbacks of the prior art.

It is another object to provide such sounds which are sufficient to attract the driver's attention, but without being unduly disturbing.

It is another object to provide such sounds without distracting the operator from other tasks involved in the operation of the vehicle.

It is another object to provide such sounds without discouraging the operator from using the turn indicator.

It is another object to provide such sounds only after a time delay which will therefore not intrude upon the driver during most short-term uses of the turn indicator.

These and other objects which will appear are achieved in accordance with the present invention as follows.

An electronic tone generator is coupled to the conventional turn indicator system of a vehicle. This tone generator is adapted to produce pulses of tone at a sound level which is substantially louder than the clicking sounds produced by the bi-metal device itself, and each tone pulse preferably also has substantially longer duration than each of said clicking sounds.

The tone generator is controlled so as to start producing its tone pulses only after the clicking sounds produced by the conventional bi-metal device have persisted for some tinge, such that said tone pulses may not be present during most normal uses of the turn indicator.

In addition, once started, the electronic pulse generator preferably produces its loud tone pulse only once for each several clicking sounds made by the bi-metal element.

The electronic tone generator may be built into the vehicle as part of its original equipment, or it may be provided in kit form for retrofit through the after market.

BRIEF DESCRIPTION OF THE DRAWINGS

For further details, reference is made to the discussion which follows, in light of the accompanying drawings wherein:

FIG. 4 is a time-line chart of the operation of that embodiment of the invention in which, after the delayed start of the electronically generated pulses, each such pulse is produced only ;after several of the clicking sounds from the bi-metal element.

FIG. 5 is a time-line chart of the operation of that other embodiment of the invention in which, after the delayed start of the electronically generated tone pulses, one such pulse is produced for each clicking sound from the bi-metal element.

DESCRIPTION OF THE PREFERRED EMBODIMENTS

Figure 1:
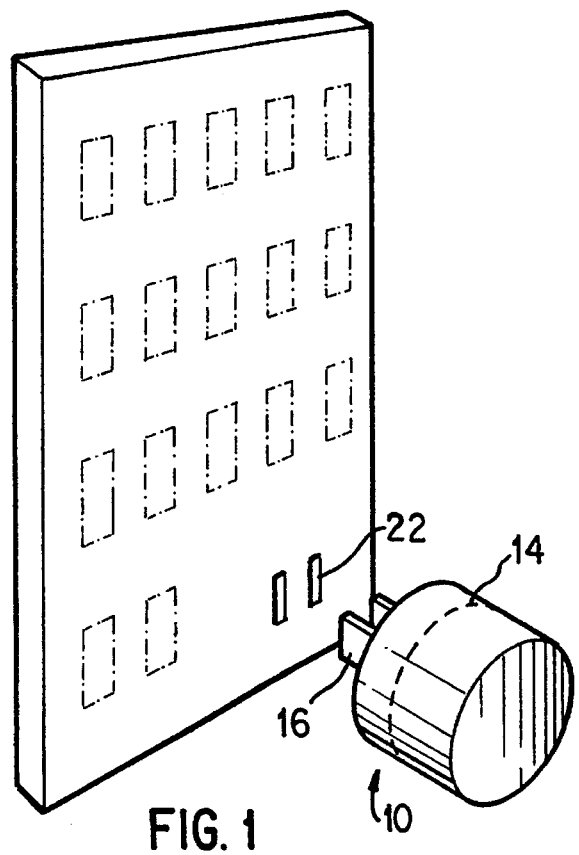
FIG. 1 is a general arrangement showing the installation of the invention in a vehicle as part of its original equipment.

The present invention 10 is shown in FIG. 1 in its configuration for providing an electronically generated, delayed tone, audible in the driver's station supplementing the display of flashing light turn signals, principally intended for but not limited to installation in newly manufactured vehicles. An alternate embodiment 12 is shown in FIG. 2 in its configuration for provision in the driver's station, supplementing the display of flashing light turn signals, principally intended for but not limited to installation as a kit in a previously delivered vehicle.

In FIG. 1, the combined flashing light power sequencer (referred to as the "flasher" herein), well known in the art, and the tone generator with its controlling electronics are integrated in a single container 14 which is fabricated from plastic or metal and attached physically to the vehicle turn signal flasher mounting provisions and connected to the electrical circuitry by means of spade terminals 16 also well known in the art.

Figure 2:
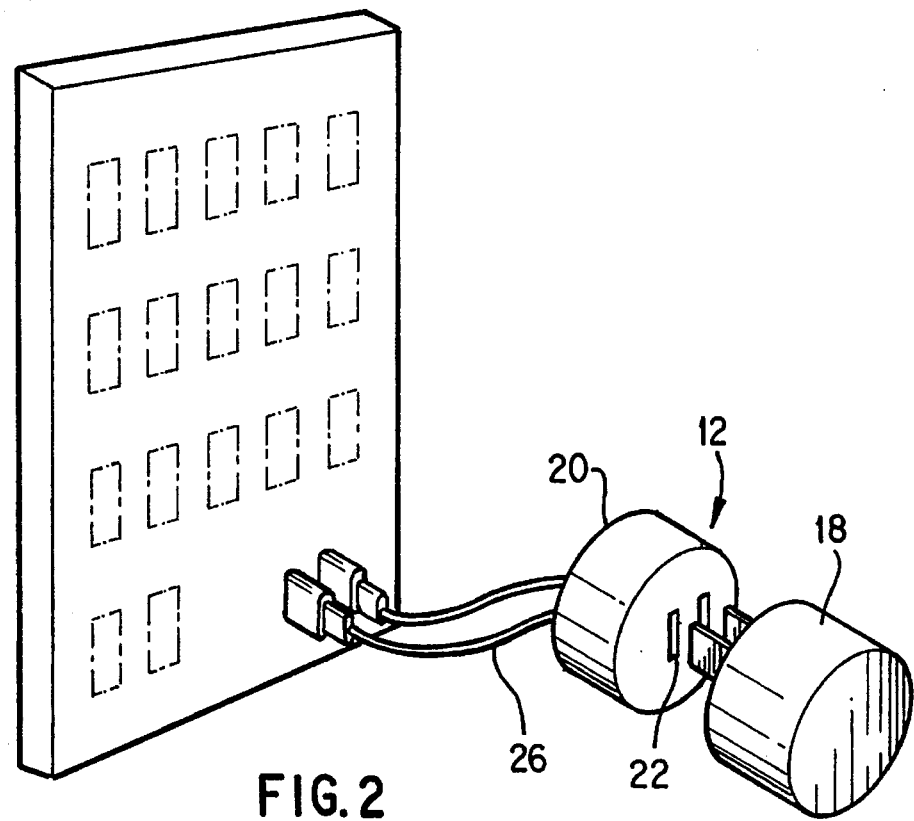
FIG. 2 is a general arrangement showing the installation of the invention as a retrofit kit.

In the alternate installation of FIG. 2, the flasher 18 is attached to the housing of the tone generator, with electronic interface unit 20 provided with the aforementioned kit engaging with the female spade terminals 22 provided on said tone generator with electronic interface unit. The female spade terminals are recessed within the housing to prevent short circuiting the vehicle electrical system. In turn, the tone generator with electronic interface unit 20 is provided with an electrical lead or "pig-tail" 26 comprising two insulated conductors of a short, equal length sufficient to allow the joined "flasher" 18 and tone generator with electronic interface unit 20 to be stowed with the vehicle sub-system provisions, said lead terminating in male spade terminals to engage with the female spade terminals provided in the vehicle turn signal flasher mounting provisions.

The aforementioned kit consists of one tone generator with electronic interface unit 20, plus supporting instructions and other customary paperwork, plus an optional quantity of ties to fasten said tone generator into position.

Figure 3:
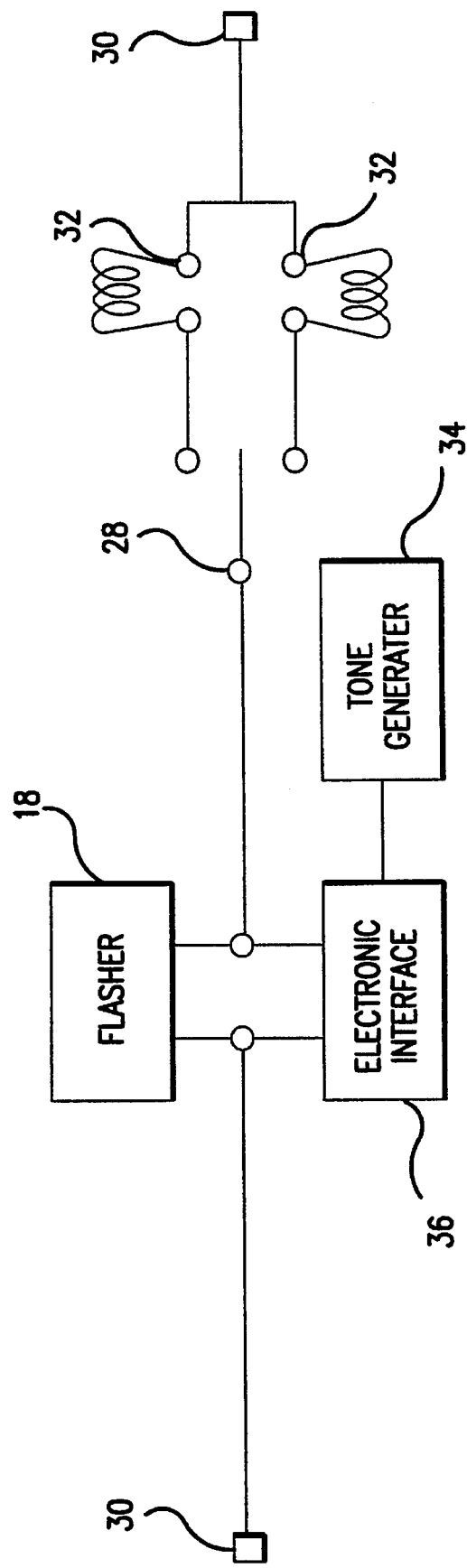
FIG. 3 is a block diagram of the electronic components of the invention.

FIG. 3 shows, in block diagram form, the present invention in which the flashing light turn signal is augmented by an electronic tone audible at the driver's station of a motorized vehicle, said tone to commence after a delay, following the selection of the turn signals "on" to continue as a pulsed output, and to stop at the time the said signal is canceled by turning off the turn signal lever 28, either by the action of the driver or the automatic turn signal canceling mechanism. A conventional turn signal circuit is depicted, known in the prior art. It includes the source of vehicle power 30, the external and internal turn signal lamps 32, the turn signal lever 28 used to select left or right signals, and the flasher unit 18. Shown as an addition to this turn signal circuit are the electronic interface unit 36 of the present invention, which is connected across the "flasher" unit 18, and which includes an R/C timer or alternatively an electronic pulse counter and also a reset unit, the purpose of which is to return the said timer or pulse counter to its initiating state in a short period of time following the return of the turn signal lever to the off position. This ensures that the correct time delay or pulse count will be experienced should a new turn signal be commanded shortly after having been returned to the "off" position. The electronic tone generator 34 is connected to the electronic interface unit 36.

The time line shown in FIG. 4 describes the present invention which provides for a series of short duration tone pulses separated by significant time delays shown in relation to the cycles of the flashing lights utilized in turn signals known in the art. FIG. 4 shows the initiation of the pulsed tones following a predetermined elapsed time or flashing light pulse count after the driver selects the turn signals "on" using the turn signal lever (28 in FIG. 3). Flashing light signals start at "0" on time line 38. This event is followed by an interval 32, during which the flashing lights and the clicking sounds from the bi-metal element of the turn indicator system are the only signals that are in operation. It will be noticed that the length of interval 32 is left to the choice of those skilled in the art; a period of between 15 and 30 seconds is envisioned. A device in which the time interval 32, by which the start of the pulsed tone of the invention is delayed relative to the flashing light signal, is adjustable by the user is an alternative to a device in which said time interval is fixed. Upon reaching time 40, the reset has been removed from the time delay network, which has completed its timeout or count.

The time line shown in FIG. 5 describes that alternative embodiment of the present invention in which a series of tone pulses at approximately the same rate as the flashing light signals are produced frollowing a time delay after initiation of the turn signals, overlaid on the cycles of the flashing lamp system utilized in turn signals known in the art. FIG. 5 shows the initiation of the pulsed tone commencing after an elapsed time or flashing lamp pulse count after the driver selects the turn signals "on" using the turn signal lever (28 in FIG. 3). Flashing lamp signals commence at "0" on the time line 42. This event is followed by an interval 44, during which the flashing lamps and the clicking sounds of the bi-metal element are the only signals in operation. It will be noticed that the length of period 44 is left to the option of those skilled in the art; a period of approximately 20 to 40 seconds is envisioned. A device in which the time lapse by which the pulsed tone follows the flashing light signal 44 is adjustable by the user is an alternative to a device in which said time lapse is fixed.

Upon reaching time 46, the reset has been removed from the time delay network, which has completed its timeout or count, the tone commences to sound and both the visual and the audible signals continue in operation until the turn signal switch (28 in FIG. 3) is opened at time 24 in FIG. 5. It should be noted that, although the visual and the audible signals are shown for simplicity of presentation as possessing the same synchronized frequency, the said signals are not necessarily so synchronized. The turn signal system is then ready for the next cycle.

Figure 6:
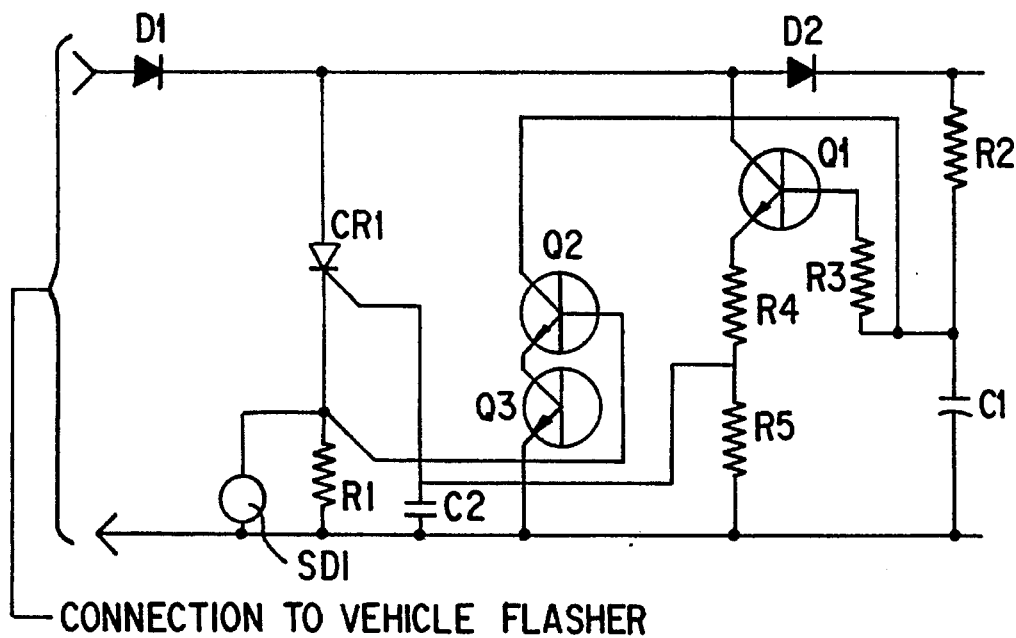
FIG. 6 is a schematic diagram of the embodiment of FIG. 4.

FIG. 6 is a schematic diagram of a circuit embodiment of the present invention in which a series of single, short duration tone pulses are separated by significant time delays and in which the time delay is provided by an R/C network following the initiation of the flashing light turn signal by the driver of a motorized road vehicle. This corresponds with the time line of FIG. 4. The circuit is connected to the thermo-mechanical flasher terminals, otherwise unmodified, using the connection points so labeled. During the period of turn signaling, the intermittent, pulse signal power appearing at diode D1 charges capacitor C1, which, when sufficient voltage appears across C1, turns on transistor Q1 which in turn, gates SCR 1, which causes the tone generator to sound and also turn on transistor Q3 which grounds capacitor C1, resetting the RC network to time out the significant period until the next short tone pulse, the cycle continuing until turn signal power is removed by turning off switch 28 (FIG. 3).

Representative circuit components for FIG. 6 are shown below.

| | |
|---|---|
| D1, D2 | Diode 1N 914 |
| CR1 | SCR 1.5 amp, 200 volt |
| C1 | Capacitor 22 uf |
| C2 | Capacitor 0.1 uf |
| R1 | Resistor 330 Ω |
| R2 | Resistor 1 meg Ω |
| R3 | Resistor 1 meg Ω |
| R4 | Resistor 22 k Ω |
| R5 | Resistor 4.7 k Ω |
| Q1, Q2, Q3 | Transistor, switch, 0.8 amp |
| SDI | Tone Generator & interface |

It will be noted that this circuit configuration yields tone pulses which are spaced by the same time intervals as the delay for the first of these pulses.

Figure 7:
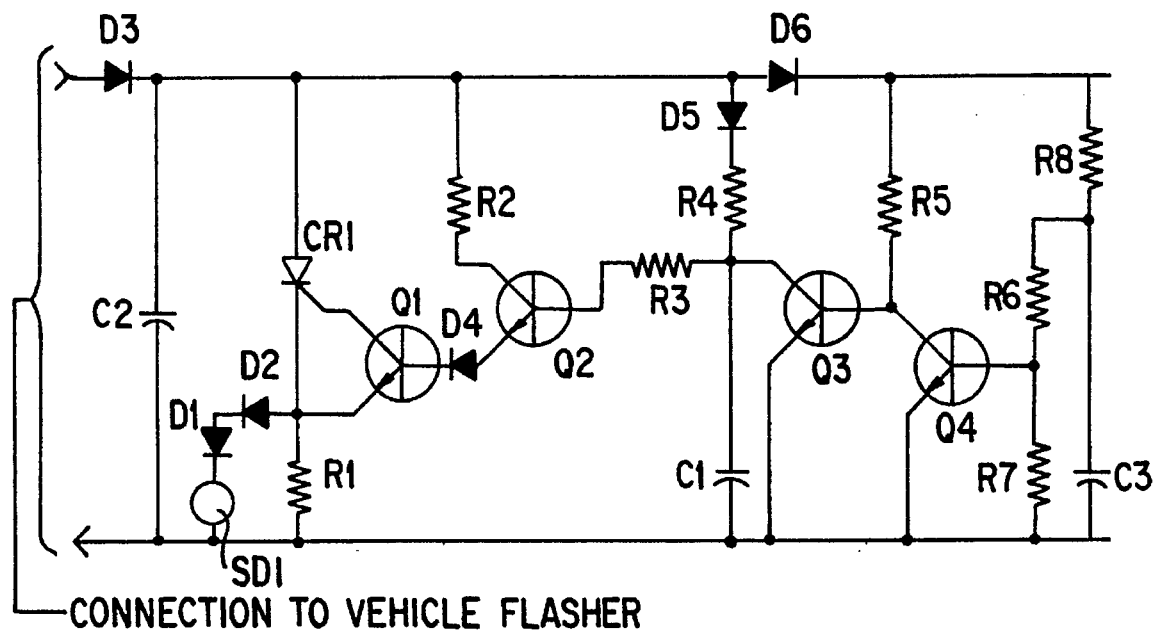
FIG. 7 is a schematic diagram of the embodiment of FIG. 5.

FIG. 7 is a schematic diagram of that alternate embodiment of the present invention in which a series of tone pulses at approximately the same rate as the flashing light signals are produced following a time delay after initiation of the turn signal system and in which the time delay is provided by an R/C network following the initiation of the flashing light turn signal by the driver of a motorized road vehicle.

This circuit of FIG. 7 is connected to the thermo-mechanical flasher terminals, otherwise unmodified, using the connection points so labeled. During the period of turn signaling, the intermittent pulse signal power appearing at diode D3 charges capacitor C1 which, when sufficient voltage appears across C1, turns on transistor Q1 which inturn gates SCR1, which causes the tone generator to sound with uniform amplitude pulses until the turn signal power is removed at 24 (in FIG. 5). While turn signal power is present, capacitor C2 charges rapidly thru R8, keeping Q4 conducting to ground and Q3 turned off, leaving C1 to function as described above. When turn signal power is removed, voltage at Q4 base depletes rapidly and allows R5 to turn on Q3, grounding C1 and resetting the system for the next turn signal operation.

Representative circuit components for FIG. 7 are shown below.

| | |
|---|---|
| D1 thru D6 | Diode 1N 914 |
| CR1 | SCR 1.5 amp, 200 volt |
| C1 | Capacitor 22 uf |
| C2 | Capacitor 10 uf |
| C3 | Capacitor 22 uf |
| R1 | Resistor 330 Ω |
| R2 | Resistor 10 k Ω |
| R3 | Resistor 1 meg Ω |
| R4 | Resistor 4 meg Ω |
| R5 | Resistor 33 k Ω |
| R6 | Resistor 320 k Ω |
| R7 | Resistor 33 k Ω |
| R8 | Resistor 10 Ω |
| Q1 thru Q4 | Transistor, switch, 0.8 amp |
| SDI | Tone Generator & Interface |

Numerous variations and modifications of the invention described above will occur to those skilled in the art in light of this disclosure.

For example, the pulsed tones according to this invention may have a variety of sound qualities, so long as they are conspicuously different from those produced by the turn indications which are provided without the present invention. Thus, they may be chimes or buzzing sounds, etc. The important characteristic is that they provide a clear break in, and a conspicuous contrast from those turn indicator sounds which are otherwise present.

It is contemplated, therefore, that the present invention may be practiced otherwise than specifically described herein while remaining within the scope of the following claims which define the invention.

What is claimed is:

1. An apparatus for use with a vehicle having a turn signal system activatable by the operator of the vehicle, which system includes means responsive to activation of said system to produce first periodic audible signals, said apparatus comprising:

means also responsive to said activation to produce separate additional periodic audible signals whose start is delayed with respect to said system activation, said additional signals consisting of single tone pulses, each louder than any one of said first periodic signals, each of longer duration than any one of said first signals and separated from each other in time by intervals equal to several periods of said first periodic signals.

2. The apparatus of claim 1 wherein said additional audible signals are produced for substantially as long as said turn signal system remains activated, after said delay.

3. The apparatus of claim 1 further comprising means for terminating said additional signal in response to deactivation of said turn signal system.

4. The apparatus of claim 1 characterized in that said additional signals producing means is built into the vehicle as original equipment.

5. The apparatus of claim 1 characterized in that said additional signals producing means is in the form of a vehicle retrofit kit.

6. An apparatus for use with a vehicle having a turn signal system activatable by the operator of the vehicle, which system includes means responsive to activation of said system to produce periodic clicking sounds, said apparatus comprising:

electronic tone generator means also responsive to said activation to produce separate periodic pulses of tone, each at a sound level which is substantially louder than any of said clicking sounds, the start of said tone pulses being delayed with respect to said system activation, and said tone generator means producing said louder tone pulse only once for each several clicking sounds produced by said system.

7. The apparatus of claim 6, wherein each said tone pulse is of substantially longer duration than any one of said clicking sounds.

8. The apparatus of claim 6, wherein said tone pulses are single pulses, separated by a time delay equal to a plurality of periods of said periodic clicking sounds.

9. An apparatus for use with a vehicle having a turn signal system activatable by the operator of the vehicle, which system includes means responsive to activation of said system to produce first periodic audible signals, said apparatus comprising:

> means also responsive to said activation to produce separate additional periodic audible signals whose start is delayed with respect to said system activation and each of which is louder and of longer duration than any one of said first periodic audible signals, said additional signal producing means including
>
> a series resistor-capacitor circuit, so connected to the system that the capacitor is progressively charged in step with consecutive ones of said first audible signals,
>
> a SCR gate circuit which is gated on to conduct in response to the capacitor charge reaching a level corresponding to a plurality of said first signals,
>
> a tone generator activated by said SCR conduction, and
>
> means for discharging said capacitor in response to said conduction thereby preventing said SCR from being gated on again until the capacitor is recharged to said level corresponding to a plurality of first signals.

* * * * *